(12) United States Patent
Spicer

(10) Patent No.: US 6,202,007 B1
(45) Date of Patent: Mar. 13, 2001

(54) EXACT STABILITY INTEGRATION IN NETWORK DESIGNS

(76) Inventor: John A. Spicer, 4666 N. State Rte. 235, Conover, OH (US) 45317-9601

( * ) Notice: Subject to any disclaimer, the term of this patent is extended or adjusted under 35 U.S.C. 154(b) by 0 days.

(21) Appl. No.: 09/253,098

(22) Filed: Feb. 19, 1999

(51) Int. Cl.$^7$ ............................... F42B 12/54; B64G 1/28
(52) U.S. Cl. ................... 701/3; 244/3.1; 280/1.21
(58) Field of Search ............................ 701/3, 4; 244/3.1, 244/3.23, 3.24, 92, 93, 164, 177; 280/1.21; 367/906

(56) References Cited

U.S. PATENT DOCUMENTS

| | | | |
|---|---|---|---|
| 4,520,972 | * 6/1985 | Diesinger et al. | 244/3.1 |
| 4,979,940 | 12/1990 | Bobo, Jr. et al. | 604/50 |
| 5,005,353 | * 4/1991 | Acton et al. | 60/39.281 |
| 5,148,514 | 9/1992 | Arima et al. | 395/24 |
| 5,153,923 | 10/1992 | Matsuba | 382/14 |
| 5,197,114 | 3/1993 | Skeirik | 395/22 |
| 5,224,203 | 6/1993 | Skeirik | 395/22 |
| 5,282,261 | 1/1994 | Skeirik | 395/22 |
| 5,293,457 | 3/1994 | Arima et al. | 395/24 |
| 5,379,210 | * 1/1995 | Gruji et al. | 364/148 |
| 5,629,845 | 5/1997 | Liniger | 364/172 |
| 5,634,004 | 5/1997 | Gopinath et al. | 395/200.02 |
| 5,667,171 | * 9/1997 | Fowell et al. | 244/165 |
| 5,991,525 | * 11/1999 | Shah et al. | 395/500.23 |

OTHER PUBLICATIONS

Spicer, John, "Exact Stability Integration in Network Designs with Applications in Radar, Process Control Flight Dynamics and Celestial Mechanics", Wright Laboratories, Avionics Directorate, WPAFB, p. 1–9 (Month and Year Are Not Available).*

Hung et al., "Investigation of Numerical Techniques as Applied to Digital Flight Control system", Air Force Flight Dynamic Laboratory Research and Technology Division, WPAFB, pp. A–64 to A–83, Feb. 1967.*

* cited by examiner

Primary Examiner—Tan Nguyen
Assistant Examiner—Dalena Tran
(74) Attorney, Agent, or Firm—Ralph L. Marzocco

(57) ABSTRACT

A self starting predictor corrector method of arbitrary order is disclosed that uses exact stability integration in network designs for application in systems optimizing control of aircraft through improved numerical techniques. Such method defines a self starting predictor corrector routine for a numerical solution of differential equations having a main process that computes derivatives of the states with a n-th order numerical solution for a n-th order differential equation. Moreover, such method configures an exact stability algorithm for generating a numerical integration of a high order of any type linear or nonlinear filter or network by constraining extraneous eigenvalues in the high order filter or network to be a definite value.

7 Claims, 1 Drawing Sheet

EXACT STABILITY INTEGRATION IN NETWORK DESIGNS

GOVERNMENT RIGHTS

This invention was made with support by the U.S. Government. The Government may have certain rights in this invention.

BACKGROUND OF THE INVENTION

1. Field of the Invention

The present invention generally relates to a method for using exact stability integration in network designs. More particularly, the invention relates to a method for using exact stability in net-work designs for application in systems optimizing flight control of aircraft through the use of improved numerical techniques.

2. Description of the Prior Art

The idea of exact stability integration originated during the course of an U.S. Air Force study whose objective was to advance the flight control of aircraft through improved numerical techniques. One of the techniques that was investigated was a predictor-corrector approach that had exact stability for second and fourth order systems.

Mathematical literature describes integration algorithm in terms of order, i.e. first order, second order, - - - up to any order of which the computer is capable. However, integration at higher orders designs a system that is always stable and completely controllable with a deadbeat response. According to Warwick and Tham, the dead-beat response provides the required robustness of the system by causing the response of the estimation error to reach equilibrium in minimum time. Warwick, Kevin and Tham, Ming T., "Failsafe Control Systems," Chapman and Hall, New York, 1991, p. 126,127.

The intrinsic robustness of a dead-beat response is achieveable with an exact stability system (as opposed to an absolute stability system) inasmuch as the observer is strongly decoupled from unwanted disturbances and moderately decoupled from faults resulting in a network with a dead-beat response having the desired stability, robustness and controllability response desired which can be easily obtained when exact stability is used as a design tool and using the technique of process control. According to Kalman, exact stability provides complete control if there exists a sampled-data controller which has a dead-beat response. Kalman, R. E., "On the General Theory of Control Systems", First International Federation Automatic Control, Moscow, Butterworths, Vol. 1, pp 481–492 (1961).

Representative of the prior patent art directed to proportional integration system in combination with a dead-beat system is U.S. Pat. No. 4,979,940 (Bobo, Jr. et al.). The patent discloses an infusion system, methodology, and algorithm for identifying patient-induced pressure artifacts.

Representative of the prior patent art directed to network with order integration and controlling algorithm are U.S. Pat. No. 5,148,514 (Arima et al.), U.S. Pat. No. 5,224,203 (Skeirik), U.S. Pat. No. 5,282,261 (Skeirik), and U.S. Pat. No. 5,293,457 (Arima et al.). Arima et al. discloses neural network integrated circuit device having self-organizing function. Skeirik discloses on-line process control neural network using data pointers, and neural network process measurement and control.

Representative of the prior patent art directed to high order information processing for a network that has a controlling algorithm and order integration is U.S. Pat. No. 5,513,923 (Matsuba et al.). The patent discloses high order information processing method by means of a neural network and minimum and maximum searching method therefor.

Representative of the prior patent art of general interest are U.S. Pat. No. 5,197,114 (Skeirik) directed to computer neural network regulatory process control system and method; U.S. Pat. No. 5,629,845 (Liniger) directed to parallel computation of the response of a physical system; and U.S. Pat. No. 5,634,004 (Gopinath et al.) directed to directly programmable distribution element.

While many of the neural network systems with order integration and controlling algorithm disclosed in the prior art generally have achieved the objectives for which they were designed, none disclose a neural network system which embodies an algorithm with integration orders as high as desired for optimization problems. Consequently, the need still exists for a neural network system exact stability algorithm, with the value of integration orders restricted by computer memory capacity, that always has dead-beat control with minimal extraneous errors added to the system.

SUMMARY OF THE INVENTION

The present invention is directed to providing a method for using exact stability in network design for application in systems for optimizing flight control of aircraft through the use of improved numerical techniques. The invention also allows for application in systems for optimizing integration step size in technological and industrial environments, maximizing the benefits of such processes with the minimum amount of truncation, roundoff and random errors in the network to obtain robust realizable and stable neural networks. Moreover, the present invention can be applied to all types of linear or nonlinear filters or networks.

Through the use of improved numerical techniques, a new concept of stability was determined which was designated exact stability because randomness arising from the extraneous eigenvalues moving randomly from −1 to +1 in absolute stability was eliminated by constraining the closed loop poles to be at the origin. By constraining the parasitic eigenvalues to be zero, integration at high order was accomplished and the order was determined to be as high as the order of integration which was wanted.

The present invention utilizes exact stability in networks designs for application in systems for optimizing the flight control of aircraft through improved numerical techniques. Optimization of the flight control of aircraft is achieved by configuring an exact stability algorithm for generating a numerical integration of a high order of any type linear or nonlinear filter or network by constraining extraneous eigenvalues in the high order filter or network to be a definite value. And designing a self starting method for a numerical solution of differential equations having a main process that describes a multiplicity of states of motion and a subprocess that computes derivatives of states with an nth order numerical solution for an nth order differential equation.

Numerical integration of networks of high order using exact stability in effect gives a dead-beat response because the extraneous eigenvalues have been constrained to be a definite value. The dead-beat response provides the requested robustness of the system by causing the response of the estimation error to reach equilibrium in minimum time. Moreover, exact stability provides complete control when there exists a sampled-data controller with a dead-beat response.

The corrector method includes a self starting routine. The numerical solution of differential equations comprises a main process that describes the states of motion and a subprocess that computes the derivatives of the states.

Additional advantages of using a system with exact stability as defined by the present invention are: (A) the corrector only is used which simplifies the coding and shortens the execution time; (B) the order of the algorithm can be set as high as desired to reduce the truncation errors as low as required if the computer has enough memory; (C) the computer develops the desired algorithm after the desired order is read from the input by starting with the first order, second order, - - - , until the desired order is obtained; (D) the dead-beat approach is very robust in sensor fault detection; and (E) a filter or network with zero parasitic eigenvalues that has a dead-beat response is completely controllable.

The foregoing and other features and advantages of the present invention will become apparent to those skilled in the art upon a reading of the following detailed description when taken in conjunction with the flow of information diagram wherein there is shown and described an illustrative embodiment of the invention.

BRIEF DESCRIPTION OF THE DRAWING

For a further understanding of the nature and object of the invention, reference should be had to the detailed description of the exemplary embodiment taken in conjunction with the appended drawing in which.

DETAILED DESCRIPTION OF THE INVENTION

Figure 1:
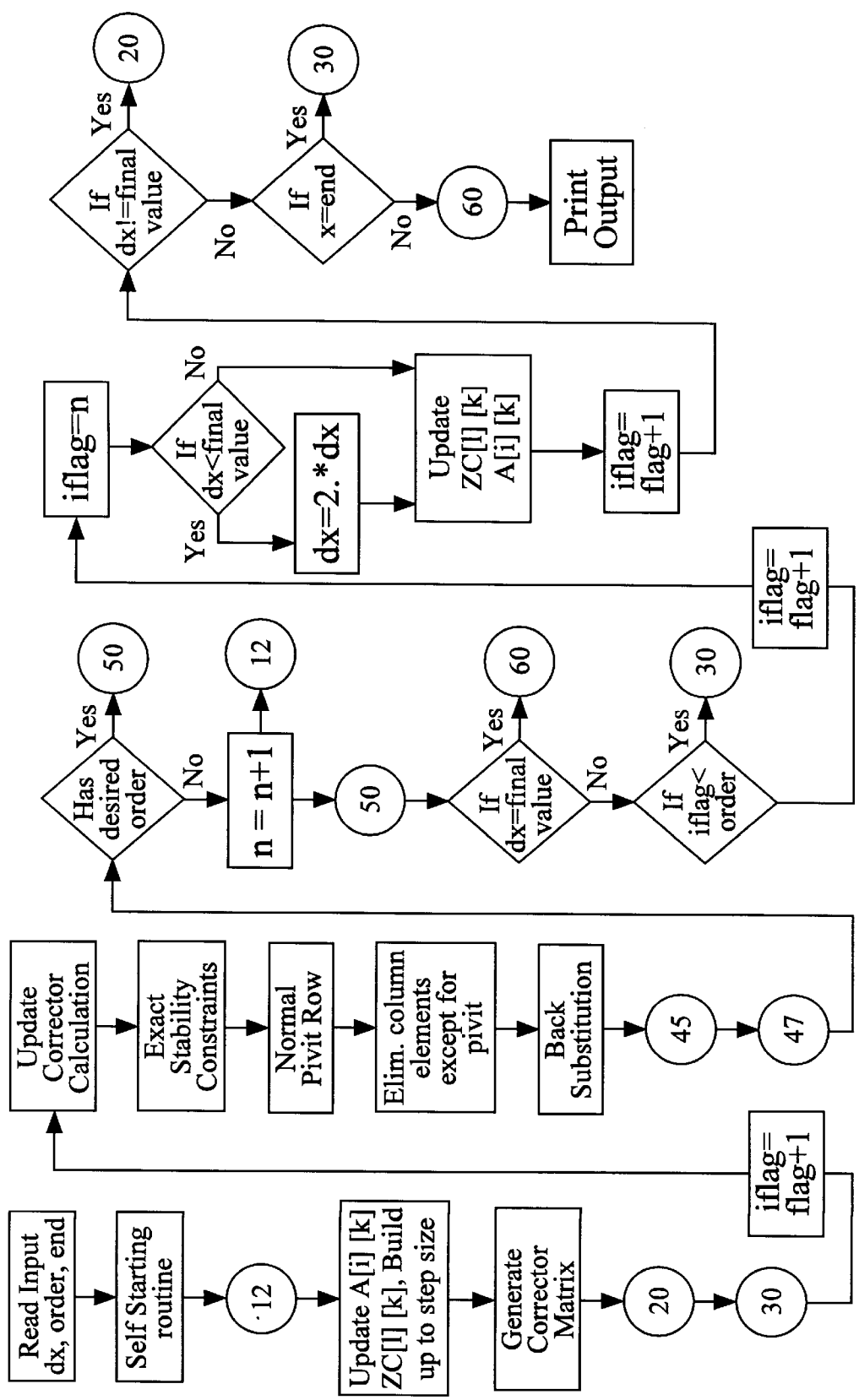
FIG. 1 is a block diagram of the high order exact stability algorithm showing the flow of information in the integration of integral equations.

Referring to the block diagram of FIG. 1 there is illustrated the flow of information in the integration of integral equations. The numerical solution of differential equations comprises a corrector method that includes a self starting routine, a main process that describes the states of motion, and a subprocess that computes the derivatives of the states.

The algorithm has the capability of generating its own high order coding. For example, if a n-th order integration is desired, the exact stability algorithm first generates the code for a n-th order integration, and then integrates at the desired coding order.

A n-th order numerical solution for a n-th order differential equation $$Y'=f(y,t),\ Y(0)=f(y_0,t_0) \tag{1}$$

has the form:

$$Y_{n+1} = \sum_{l=0}^{N-1} (a_i Y_{n-i} + h b_i Y'_{n-i}) \tag{2}$$

If the formula (2) is configured to be exactly correct for $y=1,t,t^2,\ldots,t^n$, a system of n equations is formed. To obtain exact stability constraints, one method is to obtain the Z transform of the transfer process $$y(z)/y'(z) = \frac{h(b_0 z^{-1} + b_1 z^{-2} + \ldots + b_{n-1} z^{-(n-1)})}{1 - (a_0 z^{-1} + a_1 z^{-2} + \ldots + a_{n-1} z^{-(n-1)})} \tag{3}$$

Considering (3) as the open loop response, designating $\partial f/\partial y_i$ by $-A_i$ and rearranging the closed loop for negative feedback, the pulse response of an exact stability predictor is given by $$z^{-1}\left\{\frac{(b_0 A_0 Z^{n-1} + b_1 A_1 Z^{n-2} + \ldots + A_{n-1})^h}{Z^n - (a_0 - b_0 A_0^h) Z^{n-1} + \ldots + a_{n-1} - b_{n-1} A_{n-1}^h)}\right\} \tag{4}$$

In the exact stability process a subroutine computes the derivatives of the states being integrated. A relationship between the coefficients and the zeros of an equation yields the following equalities:

$$(a_0-b_0 A_0 h) = R_0 + R_1 + \ldots + R_{n-1}$$

$$(a_1-b_1 A_1 h) = R_0 R_1 + R_0 R_2 + \ldots$$

$$\ldots$$

$$(a_{n-1}-b_{n-1} A_{n-1} h) = R_0 R_1 + \ldots + R_{n-1} \tag{5}$$

From (5) the constraint conditions necessary for exact stability are obtained $$(a_0-b_0 A_0 h) = R_0$$

and $$(a_1-b_1 A_1 h) = 0. \tag{6}$$

$$\ldots$$

$$(a_{n-1}-b_{n-1} A_{n-1} h) = 0 \tag{7}$$

Equation (6) defines the principal root and the remaining equations, (7), describe the parasitic eigenvalues of the system matrix, which are constrained to be zero. While a similar theorem for a dead-beat controller is based upon setting the column vectors in the system matrix to be zero, exact stability targets the extraneous eigenvalues in the high order system to be zero, whereas in absolute stability the parasitic eigenvalues are constrained to be less than one.

Exact stability was first programmed on the CDC 6600 supercomputer. To obtain a self starting method, the corrector is first assumed to be a first order method using only the initial value to obtain the next few values, then the order is updated to a second order, etc., until the desired order is reached. Since a one step method has a truncation error, the integration interval is decreased by a factor of 2* POW(SF) in the self starting routine, which gives eight significant figures of accuracy, when SF=30. The integration order and step size are increased in a stepwise fashion until the desired values are obtained.

The accuracy in significant figures of other values of SF for a 5th order algorithm is given in Table I.

TABLE I

| SF | Accurate to S/F |
|---|---|
| 20 | 5 |
| 30 | 8 |
| 60 | 16 |

A flow diagram of the C and Fortran programs of a dead-beat controller for numerical integration is shown in FIG. 1.

Mathematical Description of Exact Stability

Exemplification of a mathematical description of exact stability is the transformation of a Butterworth Band-Pass Filter into an stability digital filter whereby the equation of the Butterworth Band-Pass Filter is:

$$B[z] = \frac{A[k][z^4 - 2z^2 + 1]}{z^4 + B[k]z^3 + C[k]z^2 + D[k]z + E[k]} \tag{8}$$

The constants A[k], B[k], C[k], D[k], and E[k] are calculated by conventional design procedure to derive the closed loop transfer function:

$$H[k] = \frac{Ae[k]A[k][z^2 - 2z + F[k]]}{z^4[1 + Ae[k]A[k]] + z^3B[k] + z^2[C[k] - 2Ae[k]A[k]] + zD[k] + E[k] + Ae[k]A[k]F[k]} \tag{9}$$

Ae[k] is the exact stability gain constant and the constant F[k] represents an additional degree of freedom. The filter now comprises cascaded sections where k refers to the section. All the coefficients of the denominator of equation (9) are set to zero except for the highest order term. The lower order terms contain the extraneous eigenvalues that are constrained to zero. The coefficients of the denominator of equation (8) then are:

$$B[k]=0 \tag{10}$$

$$C[k]-2Ae[k]A[k]=0 \tag{11}$$

$$D[k]=0 \tag{12}$$

$$E[k]+Ae[k]F[k]=0 \tag{13}$$

The exact stability gain is computed from equation:

$$Ae[k]=C[k]/(2*A[k]) \tag{14}$$

The constant F[k] is computed from equation:

$$F[k]=-E[k]/Ae[k]A[k] \tag{15}$$

The output of the filter is given by the formula:

$$G[M] = \frac{C[k]}{(2.+C[k])} *(F[M] - 2*F[M-2] + F[K]*F[M]) \tag{16}$$

G(M) gives the input and output of the k-th section at the time M*T. This design process has been shown to lead to the dead-beat observer and to provide solutions for the design of optimal fault detection filters. Moreover, dead-beat response has been used to give minimum-time control systems or time-optimal control systems.

Description of a High Order Exact Stability Network

High-order neural networks have been shown to have impressive computational, storage, and learning capabilities. To preserve the high order information in a network, an integration procedure of at least as high an order as the network should be used. A n-th order corrector for a n-th order neural network can be written in the form:

$$Y(n+1) = \sum_{I=0}^{N-1} (a(i)Y(n-1) + b(i)hY'(n-i) + hb(-1)Y'(n+1) \tag{17}$$

This equation is solved by a numerical integration method with exact stability, and if such equation is made exact for $Y(n)=1, x, x^2, \ldots x^{n-1}$, a system of n equations is formed. The order of scheme of equation (17) is designed to be the highest positive integer n for which equation (17) satisfies the exact stability constraints.

The exact stability constraints of a high order system are those constraints that constrain the parasitic roots of a high order system to be zero. To derive these constraints the z-transform of equation (17) is taken to arrive at the transfer function $$y/y' = \frac{h(b_{-1}Z^{n-1} + b_1Z^{n-2} + \ldots + b_{n-1})}{(a_0Z^n + a_1Z^{n-1} + \ldots + a_n)} \tag{18}$$

The closed loop pulse response of an exact stability corrector is then given by $$Z^{-1}\left\{\frac{((b_0A_0Z^{n-1} + b_1A_1Z^{n-2} + \ldots + A_{n-1})^h)}{(1.+A-1^hb-1)Z^{n-1} - (a_0-b_0A_0^h)Z^{n-2} + \ldots + (a_{n-1} - b_{n-1}A_{n-1}^h)}\right\} \tag{19}$$

where $A_i=-\partial f/\partial y_i$. The relationship between the zeros of the denominator of (19) is then given by $$(a_0-b_0A_0h)/B=R_0+R_1+ \ldots +R_{n-1}$$

$$(a_1-b_1A_1h)/B=R_0R_1+R_0R_2+ \ldots +R_{n-1}R_n$$

$$\ldots$$

$$(a_{n-1}-b_{n-1}A_{n-1}h)/B=R_0R_1 \ldots R_{n-1} \tag{20}$$

where $B=(1.+A_{-1}hb_{-1})$.

From (21), the constraints necessary to force equation (18) to be exactly stable are found from $$(a_0-b_0A_0h)/B=R_0 \text{ /*}R_0=\text{principal root*/}$$

$$(a_1-b_1A_1h)/B=0.$$

$$\ldots$$

$$(a_{n-1}-b_{n-1}A_{n-1}h)/B=0. \tag{21}$$

These constraints are termed to be exact stability constraints because equation (17) is stable in the exact sense when the exact stability constraints are applied. The procedure stated above gives the algorithm for constructing a single dead-beat recurrent neural controller. This method can be extended to other systems and special cases. The method described here, however, is designed for variable order and when integrating with the new concept of variable order is combined with exact stability, a new method of processing systems of equations is obtained in which an arbitrary high order can be obtained. The present state of the art is that a new algorithm must be derived for each order of integration. With exact stability integration the programmer selects what integration order is to be used and the computer derives the algorithm and then integrates the process at that order. The system process can be integrated at any order desired provided there is sufficient memory.

Summarizing, the advantages of this procedure is that the network can have guaranteed stability, robustness, and controllability since a dead-beat response is obtained if exact stability is used as a design tool.

A program written in C as illustrated in FIG. 1 was generated to simulate exact stability integration of the states and derivatives starts with an impulse in the first block. This program comprises the high order exact stability integration program. Dynamic equations can be programmed and run to obtain the exact stability integration for the particular problem at hand. This program can be developed in the same manner that the Runge-Kutta integration is programmed, but the integration is performed in the exact stability sense if the exact stability constraints are applied, and any order can be input as the integration order as long as the computer has enough memory. The algorithm order can be as high as the computer has memory and there will be no extraneous roots to cause instability, inaccuracy or controllability.

A system of 4 non-linear time varying differential equations were solved by both the Runge-Kutta and the exact stability method with an integration step of dt=0.1. Fourth order Runge-Kutta took 11.5 seconds execution time, whereas the exact stability method took 5.1, 7.1, 11.4, and 26.0 seconds for the 2nd, 3rd, 4th and 6th orders of integration, respectively. These results show that the exact stability 4-order integration time is comparable or slightly less than the same problem integrated with 4th order Runge-Kutta integration. The work was done in Fortran on the CDC 6600.

The algorithm can also be programmed on Unix and personal computers to give interactive performance. The exact stability algorithm was programmed on the Macintosh IIci in the C language to eliminate or minimize the turn-around time. The algorithm was also programmed in the C language and in Fortran on the Unix and Paragon computers which provides quick turn-around time and in highly non-linear problems at least 10 significant figures of accuracy were obtained by using the step size of integration 0.01. If necessary by decreasing the step size or by increasing the order of the algorithm, the accuracy can be increased, however, in many cases the first order of integration is all that is required to obtain a satisfactory solution. The advantage of using a first order system is that the CPU processing time is small which is discernable in interactive systems.

Increasing the order of the algorithm proved to be more effective on large mainframes such as the CDC 6600 Supercomputer which gave the results shown in Table II using a step size of 0.1 and double precision arithmetic.

TABLE II

| Order of Integration | Significant Figures of Accuracy |
|---|---|
| 4th | 10 |
| 7th | 14 |
| 9th | 22 |
| 10th | 22 |

On the Intel Paragon the 1st order of exact stability integration, using double precision, gives 8–11 significant figures of accuracy with a hundredth of a second time step. Because the CPU time is approximately in proportion to the power of the order of integration, it is advantageous to use the lowest order of integration available to integrate.

Computational Results

On the MBV Optic_nerv Unix a system of ten non-linear equations which had the derivative values:

p[1]=x;
p[2]=x*x;
p[3]=x*x*x;
p[4]=x*x*x*x;
p[5]=x*x*x*x*x;
p[6]=x*x*x*x*x*x;
p[7]=x*x*x*x*x*x*x;
p[8]=x*x*x*x*x*x*x*x;
p[9]=x*x*x*x*x*x*x*x*x;
p[10]=x*x*x*x*x*x*x*x*x*x;

The solution is given by:

Y[i]=∫p[i]] and, for example, integrating p[1] is given by ∫x=x*x/2., etc.

The exact stability algorithm was originally coded in Fortran on the CDC 6600. It was then coded in C on the Macintosh and then coded both in C and Fortran on the Unix. The C version on the Unix is spicedl.c and the object version is spicedl. Running a first order algorithm on the MBV's Labs Unix optic-nerv, the Computers' Centers SS2 or Paragon gives the following results:

optic-nerve 24: spicedl
input dx—the integration step size desired: 0.01
input n—the order of the algorithm: 1
input end—ending integration point: 1000.
input nsys—the number of equations to be integrated: 10
step size—0.010000
integ. order=1
end value 1000.000000
nsys=10
Exact solution of equations from the above inputs are:
x=1.000000e+03, ord=1, dx=0.010000
Y[1]=500000.000000,
Y[2]=333333333.349541,
Y[3]=250000000024.466278,
Y[4]=200000000032750.093750,
Y[5]=166666666707724064.000000,
Y[6]=142857142906509312000.000000,
Y[7]=125000000057682348212224.000000,
Y[8]=111111111177115183104393216.000000,
Y[9]=100000000074326731180203835392.000000,
Y[10]=90909090991742220599584048021504.000000.

The results show that ten significant figures of accuracy are obtained for first order integration. The number of significant figures desired can usually be obtained by increasing or decreasing mainly the step size and sometimes by increasing the integration order, however, on the Unix, Macintosh and PC's the order 1 is usually used to give quick turn around time as the CPU time in higher orders increases approximately in direct proportion to the power of the order as it is increased. On the CDC 6600 the significant figures of accuracy are shown on TABLE II which shows that 22 significant figures of accuracy can be obtained for a tenth order algorithm.

The applications of the algorithm are limitless, for example, the literature discloses some 142 examples of using integration by ordinary and partial differential equations in process control alone.

Process Control

The field where integration by ordinary and partial differential equations is very applicable is in Process Control. The algorithm described in FIG. 1 shows the flow of information in the intergation of integral equations. The information of FIG. 1 is then coded in C, Fortran or other language to obtain the simulation of integrative differential equations. The method used herein describes a one-dimensional filter, but the method of exact stability can also be applied to two-dimensional digital filters. Methodology that discloses the mechanics of a dead-beat exact stability two dimensional digital filter, that will always be stable and have complete controllability, will be described in another patent application. On the CDC 6600 Table III shows the results that were obtained with a step size of 0.01 and integration to the value 5.2 using double precision.

TABLE III

| Integration Order | Computer Time | Significant Figures of Accuracy |
|---|---|---|
| 5 | 24.8 Sec. | 13 |
| 6 | 37.04 Sec. | 14 |
| 7 | 53.90 Sec. | 18 |
| 8 | 76.51 | 20 |
| 9 | 106.506 | 20 |
| 10 | 144.09 | 20 |

When using exact stability integration, in integrating the sensor output, a tradeoff can be made between accuracy and computer time required. The integration orders 8, 9, and 10 have the same significant figures of accuracy which indicates that the CDC 6600 has reached its computing limit with the 8th order exact stability algorithm with 20 significant figures of accuracy. Even in celestial mechanics, where the distances are immense, small distances could be calculated with as many digits of accuracy as needed.

It is respectfully submitted that the many advantages of the present invention are obvious, that many changes of particularization and detail may be made without departing from the spirit and scope of the invention and without sacrificing any of its attendant advantages, and that the specification discloses an exemplary embodiment of a method for using exact stability integration in network designs through the use of improved numerical techniques as described and defined in the subjointed claims.

What I claim is:

1. A self-starting predictor corrector method of arbitrary order using exact stability integration in network designs for application in systems optimizing control of aircraft through improved numerical techniques comprising:

Defining a self-starting predictor corrector routine for a numerical solution of differential equations having a main process that describes a multiplicity of states of motion and a subprocess that computes derivatives of the states with a n-th order numerical solution for a n-th order differential equation; and Configuring an exact stability algorithm for generating a numerical integration of a high order of any type linear or nonlinear filter or network by constraining extraneous eigenvalues in the high order filter or network to be a definite value.

2. The self-starting predictor corrector method of arbitrary order of claim 1, wherein the n-th order numerical solution for the n-th order differential equation $Y'=f(y,t)$, $Y(0)=f(y_0, t_0)$ has the form:

$$Y_{n+1} = \sum_{I=0}^{N-1} (a_i Y_{n-i} + hb_i Y'_{n-i}).$$

3. The self-starting predictor-corrector method of arbitrary order of claim 1, wherein a system of n equations is formed by configuring the equation $$Y_{n+1} = \sum_{I=0}^{N-1} (a_i Y_{n-i} + hb_i Y'_{n-i})$$

to be exactly correct for $y=1t, t^2, \ldots, t^n$.

4. The self-starting predictor corrector method of arbitrary order of claim 1, wherein exact stability constraints are obtained by: obtaining the Z transform of the transfer process $$y(z)/y'(z) = \frac{h(b_0 z^{-1} + b_1 z^{-2} + \ldots + b_{n-1} z^{-(n-1)})}{1 - (a_0 z^{-1} + a_1 z^{-2} + \ldots + a_{n-1} z^{-(n-1)})};$$

considering $$y(z)/y'(z) = \frac{h(b_0 z^{-1} + b_1 z^{-2} + \ldots + b_{n-1} z^{-(n-1)})}{1 - (a_0 z^{-1} + a_1 z^{-2} + \ldots + a_{n-1} z^{-(n-1)})}$$

as an open loop response; designating $\partial f/\partial y_i$ by $-A_i$; and rearranging a closed loop for negative feedback to obtain the pulse response of an exact stability predictor given by $$z^{-1}\left\{\frac{(b_0 A_0 Z^{n-1} + b_1 A_1 Z^{n-2} + \ldots + A_{n-1})^h}{Z^n - (a_0 - b_0 A_0^h)Z^{n-1} + \ldots + a_{n-1} - b_{n-1} A_{n-1}^h)}\right\}.$$

5. The self-starting predictor corrector method of arbitrary order of claim 1, wherein a subroutine computes the derivatives of the states being integrated by using a relationship from the formula $Ae[k]=C[k]/(2*A[k])$ between the coefficients and the zeros of an equation to yield the following equalities:

$(a_0-b_0 A_0 h)=R_0+R_1+\ldots+R_{n-1}$ $(a_1-b_1 A_1 h)=R_0 R_1+R_0 R_2+\ldots$ $\ldots$ $(a_{n-1}-b_{n-1} A_{n-1} h)=R_0 R_1 \ldots R_{n-1}$ from which the constraint conditions necessary for exact stability are obtained by virtue of $(a_0-b_0 A_0 h)=R_0$ and $(a_1-b_1 A_1 h)=0$, which define the principal root, and $(a_1-b_1 A_1 h)=0$, and which equation describes the parasitic eigenvalues of the system matrix which are constrained to be zero.

6. The self-starting predictor corrector method of arbitrary order of claim 1, wherein the corrector is initially assumed to be a first order method using only the initial value to obtain the next few values, then the order is updated to a second order, etc. until the desired order is reached.

7. The self-starting predictor corrector method of arbitrary order of claim 1, wherein the integration interval, due to truncation error of the one-step method, is decreased by a factor 2*PO-W(SF) in the self-starting routine so that the integration order and step size are increased in an stepwise manner until the desired values are obtained.

* * * * *